United States Patent
Hirakawa et al.

(10) Patent No.: US 11,066,759 B2
(45) Date of Patent: Jul. 20, 2021

(54) PITCH-BASED ULTRAFINE CARBON FIBERS, METHOD FOR PRODUCING SAME, NON-AQUEOUS ELECTROLYTE SECONDARY BATTERY NEGATIVE ELECTRODE USING SAID PITCH-BASED ULTRAFINE CARBON FIBERS, AND NON-AQUEOUS ELECTROLYTE SECONDARY BATTERY HAVING SAID NON-AQUEOUS ELECTROLYTE SECONDARY BATTERY NEGATIVE ELECTRODE

(71) Applicant: TEIJIN LIMITED, Osaka (JP)

(72) Inventors: Ryota Hirakawa, Osaka (JP); Kazuki Yachi, Osaka (JP); Asami Kanematsu, Osaka (JP)

(73) Assignee: TEIJIN LIMITED, Osaka (JP)

( * ) Notice: Subject to any disclaimer, the term of this patent is extended or adjusted under 35 U.S.C. 154(b) by 23 days.

(21) Appl. No.: 15/764,407

(22) PCT Filed: Sep. 28, 2016

(86) PCT No.: PCT/JP2016/078745
§ 371 (c)(1),
(2) Date: Mar. 29, 2018

(87) PCT Pub. No.: WO2017/057527
PCT Pub. Date: Apr. 6, 2017

(65) Prior Publication Data
US 2018/0282909 A1  Oct. 4, 2018

(30) Foreign Application Priority Data
Sep. 30, 2015  (JP) .............. JP2015-192914

(51) Int. Cl.
*D01F 9/145* (2006.01)
*D06M 11/34* (2006.01)
(Continued)

(52) U.S. Cl.
CPC ............. *D01F 9/145* (2013.01); *D06M 11/34* (2013.01); *H01M 4/133* (2013.01); *H01M 4/625* (2013.01);
(Continued)

(58) Field of Classification Search
CPC . D06M 11/34; D01F 9/145; H01M 2004/027; H01M 4/625; H01M 2004/021; H01M 4/133; Y02E 60/10
(Continued)

(56) References Cited

U.S. PATENT DOCUMENTS 4,975,263 A * 12/1990 Furuyama .............. D01F 9/145
264/29.2
2007/0111101 A1* 5/2007 Ohkubo .................. H01M 4/13
429/232
(Continued)

FOREIGN PATENT DOCUMENTS

| CN | 102057086 A | 5/2011 |
| JP | 5-156522 A  | 6/1993 |

(Continued)

OTHER PUBLICATIONS

International Search Report for PCT/JP2016/078745, dated Dec. 13, 2016 (PCT/ISA/210).
(Continued)

*Primary Examiner* — Jonathan G Jelsma
*Assistant Examiner* — Omar M Kekia
(74) *Attorney, Agent, or Firm* — Sughrue Mion, PLLC

(57) ABSTRACT

The present invention provides pitch-based ultrafine carbon fibers that have an average fiber diameter of at least 100 nm
(Continued)

and less than 700 nm, and an average fiber length of 10 μm or more, wherein C—O bonds >C=O bonds in terms of the abundance ratio (molar ratio) of C—O bonds and C=O bonds derived from the O1s orbital as measured by X-ray photoelectron spectroscopy.

13 Claims, 7 Drawing Sheets

(51) Int. Cl.
    *H01M 4/133*     (2010.01)
    *H01M 4/62*     (2006.01)
    *H01M 4/02*     (2006.01)

(52) U.S. Cl.
    CPC ............ *H01M 2004/021* (2013.01); *H01M 2004/027* (2013.01); *Y02E 60/10* (2013.01)

(58) Field of Classification Search
    USPC ............................................. 429/232
    See application file for complete search history.

(56) References Cited

U.S. PATENT DOCUMENTS

| | | | |
|---|---|---|---|
| 2011/0033705 A1 | 2/2011 | Komura et al. | |
| 2011/0111294 A1* | 5/2011 | Lopez | H01M 4/134 429/217 |
| 2012/0214070 A1* | 8/2012 | Yamamoto | H01M 4/485 429/231.8 |
| 2013/0196155 A1* | 8/2013 | Paulauskas | C08J 5/042 428/367 |
| 2014/0034256 A1* | 2/2014 | Fujimori | D21H 13/26 162/138 |
| 2015/0372309 A1 | 12/2015 | Yacht et al. | |

FOREIGN PATENT DOCUMENTS

| | | |
|---|---|---|
| JP | 2010-111990 A | 5/2010 |
| JP | 2013-77479 A | 4/2013 |
| JP | 2013-108186 A | 6/2013 |
| WO | 2014/115852 A1 | 7/2014 |

OTHER PUBLICATIONS

Cuihong Mu, "Research of surface treatment and coatings on mesophase pitch-based carbon fibers", Beijing University of Chemical Technology, 2010, pp. i-iv, 13-27, (27 pages total).

Wang Chuang, "Dispersibility of Carbon Fibers and Their Electromagnetic Properties of Enhancing Cement-Based Composite Materials", Harbin Engineering University Press, Feb. 2009, pp. 60-61 (9 pages total).

* cited by examiner

[Fig. 5]
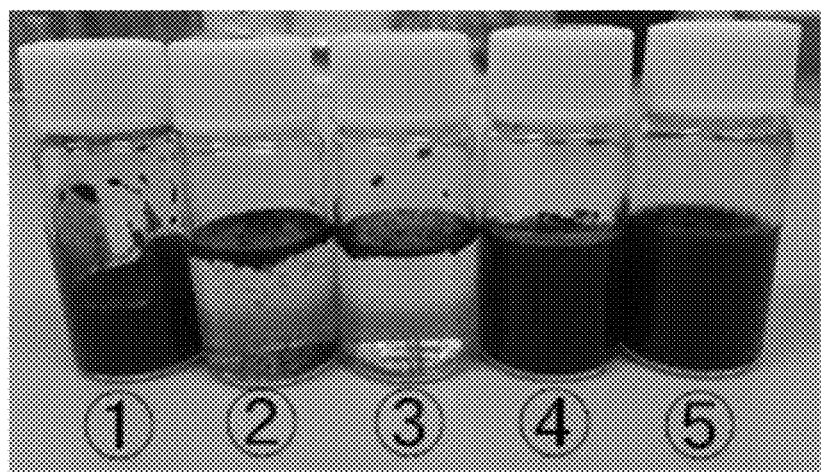
[Fig. 6]
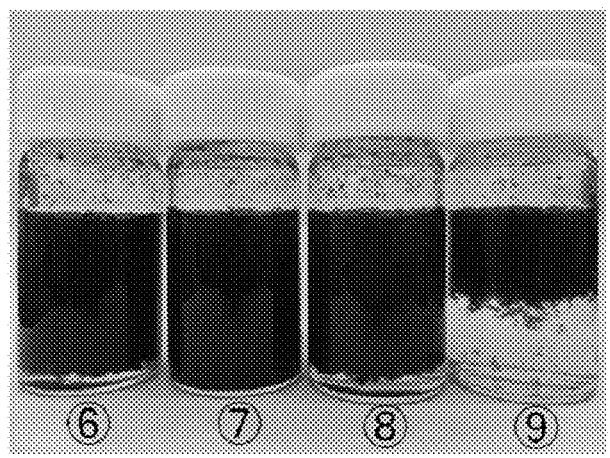
[Fig. 7]
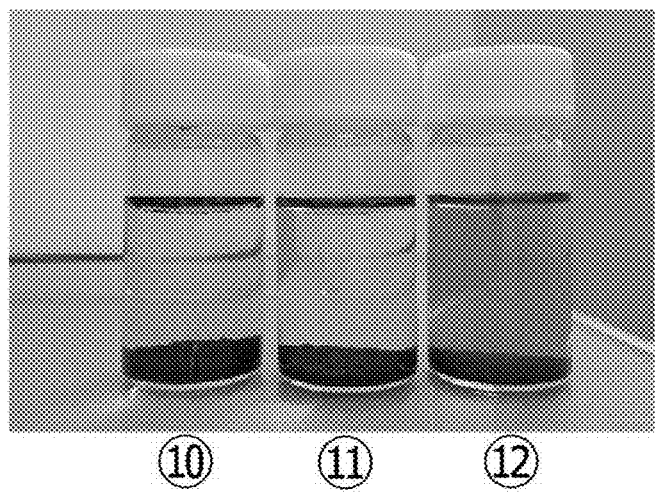

[Fig. 8]
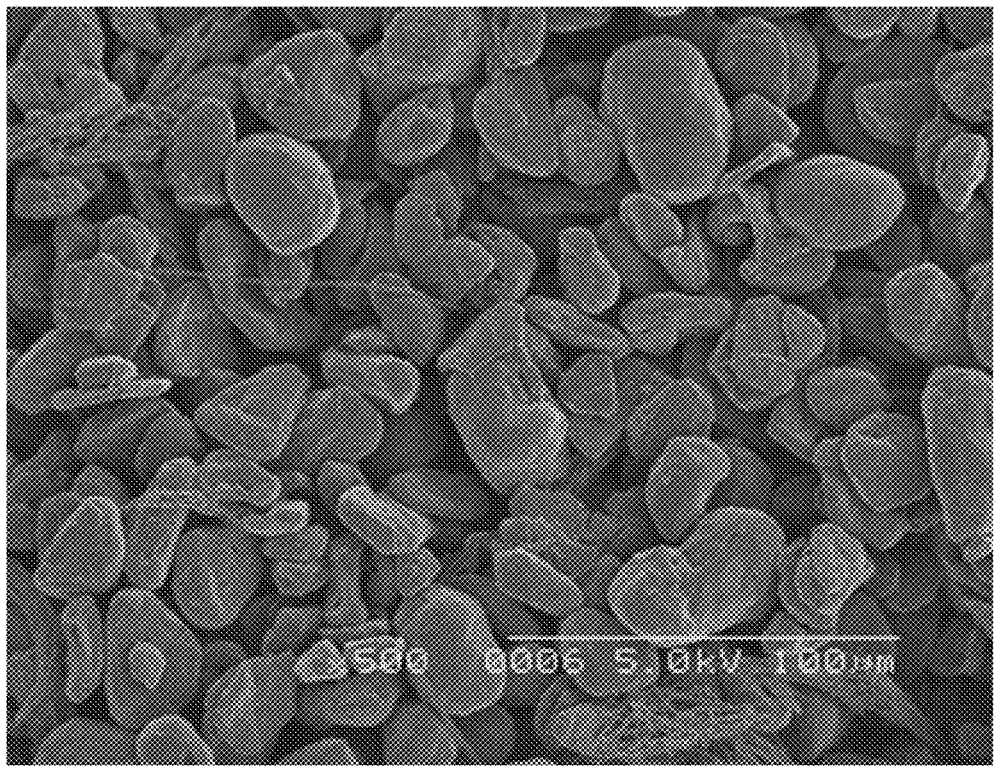
[Fig. 9]

[Fig. 10]
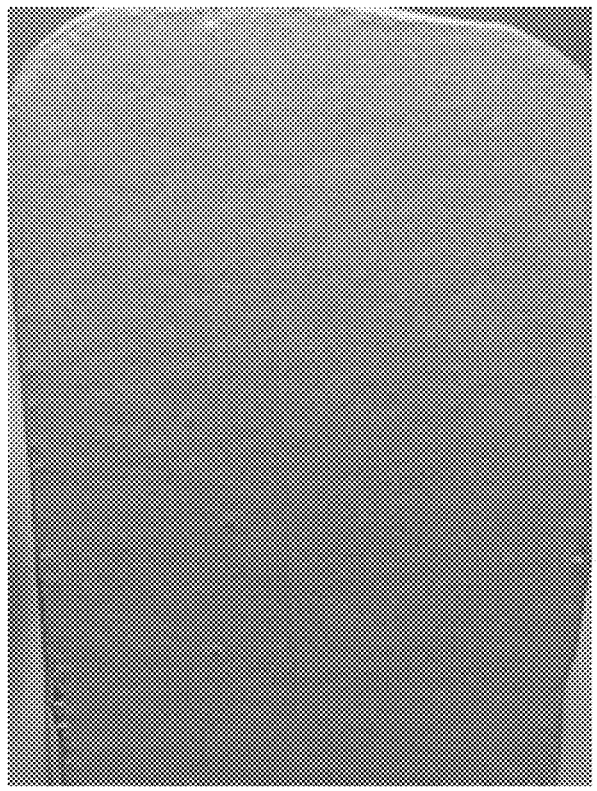
[Fig. 11]
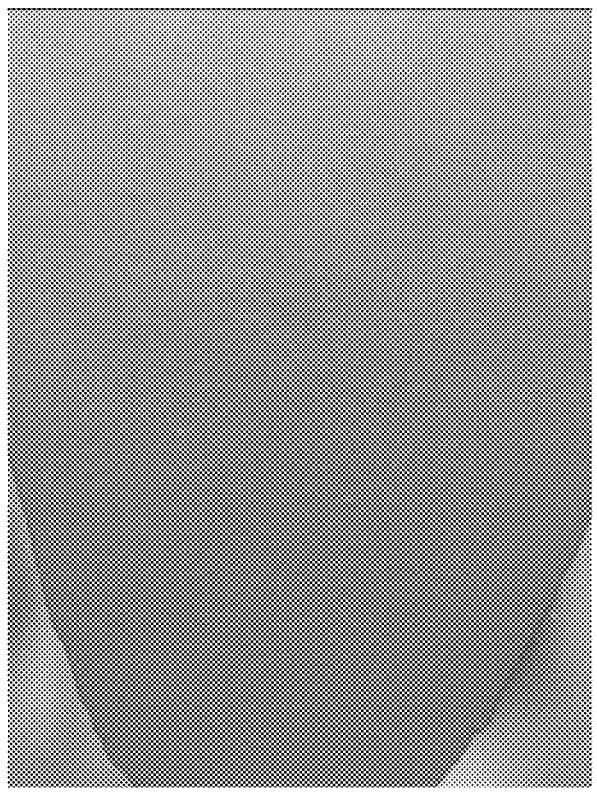

[Fig. 12]
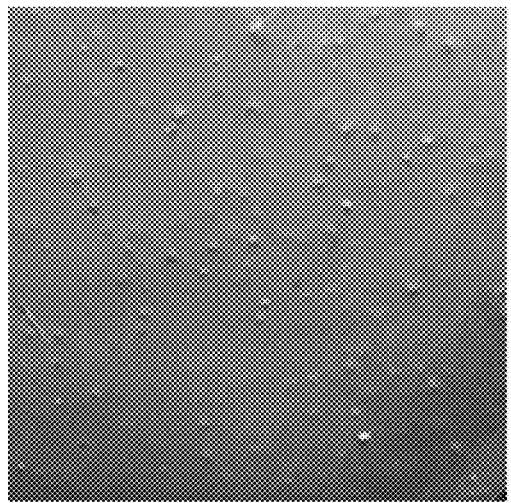
[Fig. 13]
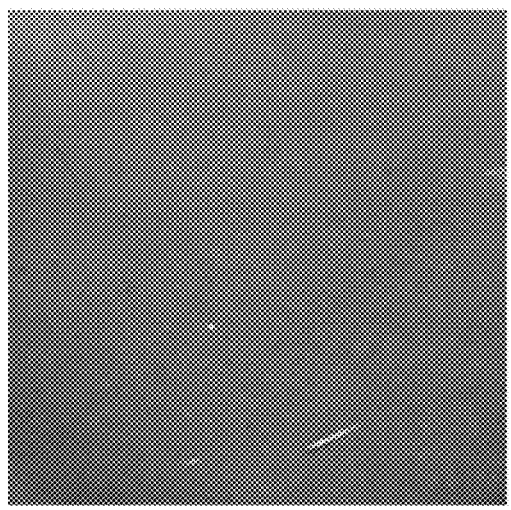
[Fig. 14]
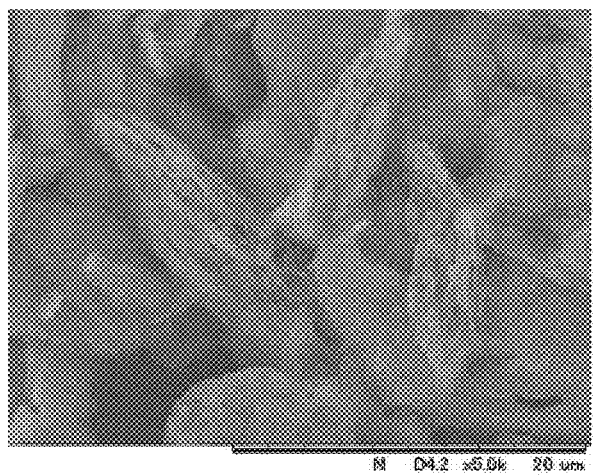

[Fig. 15]
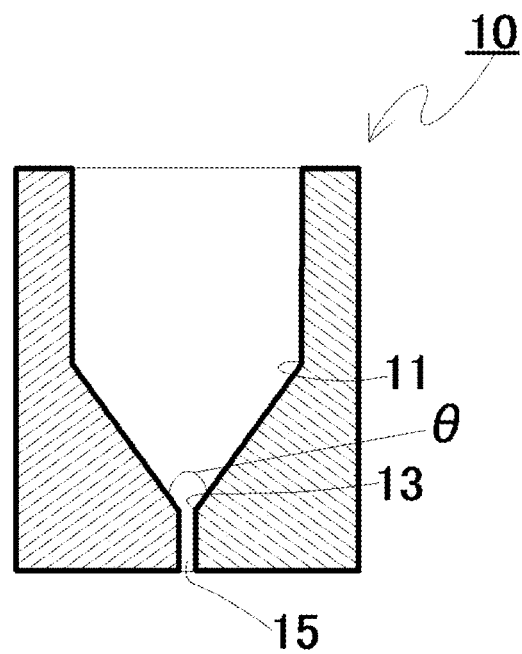

PITCH-BASED ULTRAFINE CARBON FIBERS, METHOD FOR PRODUCING SAME, NON-AQUEOUS ELECTROLYTE SECONDARY BATTERY NEGATIVE ELECTRODE USING SAID PITCH-BASED ULTRAFINE CARBON FIBERS, AND NON-AQUEOUS ELECTROLYTE SECONDARY BATTERY HAVING SAID NON-AQUEOUS ELECTROLYTE SECONDARY BATTERY NEGATIVE ELECTRODE

CROSS REFERENCE TO RELATED APPLICATIONS

This application is a National Stage of International Application No. PCT/JP2016/078745 filed Sep. 28, 2016, claiming priority based on Japanese Patent Application No. 2015-192914, filed Sep. 30, 2015.

TECHNICAL FIELD

The present invention relates to a pitch-based ultrafine carbon fiber, a method for manufacturing the pitch-based ultrafine carbon fiber, a negative electrode for a nonaqueous electrolyte secondary battery using the pitch-based ultrafine carbon fiber, and a nonaqueous electrolyte secondary battery including the negative electrode for a nonaqueous electrolyte secondary battery.

BACKGROUND ART

A lithium ion secondary battery which is one of nonaqueous electrolyte secondary batteries is a secondary battery in which lithium ions in the electrolyte are involved in electric conduction. In major lithium ion secondary batteries, a lithium metal oxide is used for a positive electrode, and a carbon material such as graphite is used for a negative electrode. Among secondary batteries, lithium ion secondary batteries have a high energy density, and therefore applications thereof have not been limited to small devices such as mobile phones, but expanded to large devices such as electric vehicles.

As one of the problems of a negative electrode included in a lithium ion secondary battery, the battery capacity is reduced due to repetition of charge-discharge. As a particularly major cause of reduction of the battery capacity, an active material is expanded and shrunk. As one of solutions for the problem, it is known that a fibrous carbon material is added to an electrode to suppress expansion and shrinkage, so that cycle characteristics are improved. For the fibrous carbon material to exhibit the above-mentioned effect, high dispersibility in water to be used for preparing a negative electrode is absolutely necessary.

Patent Literature 1 suggests a dispersion liquid with water dispersibility improved by introducing a functional group into a carbon material using a mixed acid of nitric acid and sulfuric acid. In addition, Patent Literature 2 proposes a method in which a surface of a carbon material is oxidized, or at least a part of a surface of a carbon material is modified using a surfactant.

CITATION LIST

Patent Literature

Patent Literature 1: JP 2013-77479 A
Patent Literature 2: WO 2014-115852

SUMMARY OF INVENTION

Technical Problem

In the method described in Patent Literature 1, an acid is used, and therefore it is necessary to remove an acid after treatment, resulting in complication of a process. In addition, if removal of the acid is insufficient, battery performance may be adversely affected. On the other hand, for the oxidation method described in Patent Literature 2, it is described that a treatment with hydrogen peroxide, which is capable of introducing a carboxyl group to a surface, is preferable, and there is no specific disclosure regarding air oxidation.

In addition, the present inventors have conducted studies on a form of a carbon fiber required for exhibiting high battery performance, and resultantly found that a carbon fiber having such a form has particularly low dispersibility in water.

An object of the present invention is to provide a pitch-based ultrafine carbon fiber which has a form capable of exhibiting high battery performance and which has favorable dispersibility in water; and a negative electrode for a nonaqueous electrolyte secondary battery which includes the pitch-based ultrafine carbon fiber.

Solution to Problem

The present inventors have extensively conducted studies in view of the above-described prior arts, and resultantly payed attention to a relationship between a form of an ultrafine carbon fiber and battery performance and between a bonding state of functional groups at a surface of the ultrafine carbon fiber and dispersibility. As a result, it has been found that an ultrafine carbon fiber capable of exhibiting high battery performance generally has low dispersibility owing to its form, but surprisingly, when the ultrafine carbon fiber is subjected to a surface treatment by a gas phase treatment, dispersibility can be specifically improved as compared to a chemical liquid treatment and an electrolytic treatment. It has been found that such improvement of dispersibility is associated with a ratio of C=O bonds and C—O bonds present on a surface of the ultrafine carbon fiber, leading to completion of the present invention.

That is, the present invention for solving the above-mentioned problems is as described below.

[1] A pitch-based ultrafine carbon fiber having an average fiber diameter of 100 nm or more and less than 700 nm, and an average fiber length of 10 μm or more, and satisfying the relationship of C—O bonds >C=O bonds in terms of an abundance ratio (molar ratio) of C—O bonds and C=O bonds derived from an O1s orbital as measured by X-ray photoelectron spectroscopy.

[2] The pitch-based ultrafine carbon fiber according to [1], wherein a distance (d002) between adjacent graphite sheets as measured by wide angle X-ray measurement is 0.335 to 0.340 nm.

[3] The pitch-based ultrafine carbon fiber according to [1] or [2], wherein a powder volume resistance in packing at a packing density of 0.8 g/cm$^3$ is 0.1 Ω·cm or less.

[4] A method for manufacturing the pitch-based ultrafine carbon fiber according to [1], the method including subjecting the ultrafine carbon fiber to an air oxidation treatment.

[5] The method for manufacturing the pitch-based ultrafine carbon fiber according to [4], wherein the air oxidation treatment is a heat treatment performed in an air atmosphere at 600° C. or higher for 5 to 150 minutes.

[6] A negative electrode for a nonaqueous electrolyte secondary battery including the pitch-based ultrafine carbon fiber according to [1].

[7] A nonaqueous electrolyte secondary battery including the negative electrode for a nonaqueous electrolyte secondary battery according to [6].

Advantageous Effects of Invention

According to the present invention, it is possible to obtain a pitch-based ultrafine carbon fiber having a large fiber length and a predetermined fiber diameter, and exhibiting favorable water dispersibility in a simpler process as compared to a conventional pitch-based ultrafine carbon fiber. When a negative electrode for a nonaqueous electrolyte secondary battery is prepared using the pitch-based ultrafine carbon fiber, it is possible to obtain favorable battery characteristics owing to a form and dispersibility of the pitch-based ultrafine carbon fiber.

BRIEF DESCRIPTION OF DRAWINGS

FIG. 5 is a drawing-substitute photograph showing a dispersion state of each CNF in water.

FIG. 6 is a drawing-substitute photograph showing a dispersion state of each CNF in water.

FIG. 7 is a drawing-substitute photograph showing a dispersion state of each CNF in water.

FIG. 8 is a scanning electron microscope image (magnification: 2000) of a negative electrode sheet prepared using CNF manufactured in Comparative Example 1.

FIG. 9 is a scanning electron microscope image (magnification: 2000) of a negative electrode sheet prepared using CNF manufactured in Example 1.

FIG. 10 is a drawing-substitute photograph showing a surface state of a negative electrode sheet prepared using CNF manufactured in Comparative Example 1.

FIG. 11 is a drawing-substitute photograph showing a surface state of a negative electrode sheet prepared using CNF manufactured in Example 2.

FIG. 12 is a scanning electron microscope image (magnification: 5000) of a negative electrode sheet prepared using CNF manufactured in Comparative Example 1.

FIG. 13 is a scanning electron microscope image (magnification: 5000) of a negative electrode sheet prepared using CNF manufactured in Example 2.

FIG. 14 is a drawing-substitute photograph showing a state in which CNF is aggregated.

FIG. 15 is a sectional view showing an internal structure of a discharge port portion of a spinning nozzle.

DESCRIPTION OF EMBODIMENTS

Figure 1:
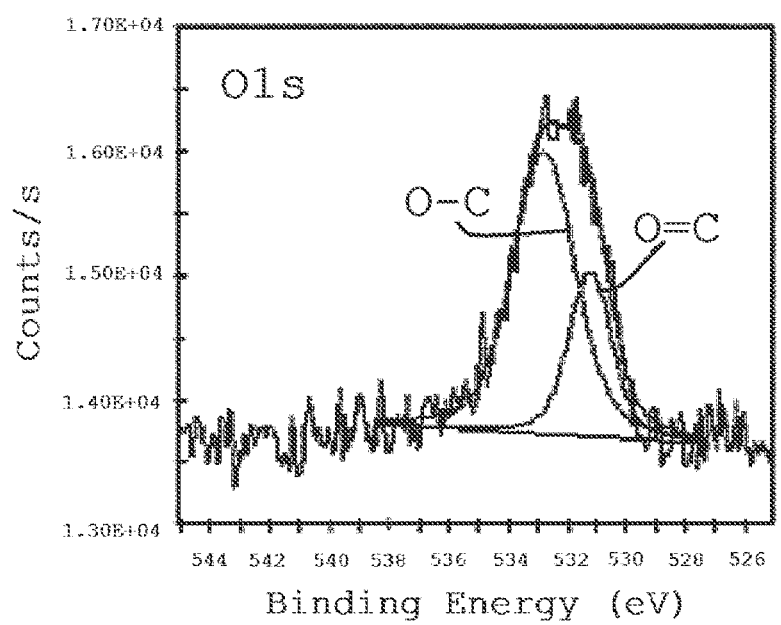
FIG. 1 shows XPS measurement results of an ultrafine carbon fiber (CNF) manufactured in Example 1.

Hereinafter, the present invention will be described in detail.

1. Pitch-Based Ultrafine Carbon Fiber for Nonaqueous Electrolyte Secondary Battery 1-1. Properties of Pitch-Based Ultrafine Carbon Fiber The pitch-based ultrafine carbon fiber (hereinafter, sometimes referred to simply as a carbon fiber) of the present invention satisfies the relationship of C—O bonds> C=O bonds in terms of an abundance ratio (peak intensity ratio) of C—O bonds and C=O bonds derived from an O1s orbital in measurement of a surface of the fiber by X-ray photoelectron spectroscopy. When this relationship is satisfied, the ultrafine carbon fiber contains a larger number of C—OH groups (hydroxyl groups) as functional groups on a surface of the ultrafine carbon fiber, and therefore dispersibility in water is improved. The abundance ratio of C—O bonds and C=O bonds (C—O bonds/C=O bonds) is more preferably 1.1 or more, still more preferably 1.5 or more. The abundance ratio of C—O bonds and C=O bonds (C—O bonds/C=O bonds) is more preferably 3.0 or less, still more preferably 2.5 or less, especially preferably 2.0 or less. When the abundance ratio is less than 1.1, water dispersibility is low. When the abundance ratio is more than 3.0, there is no problem from the viewpoint of water dispersibility, but the surface is excessively oxidized by the air oxidation treatment, which may cause a process-related problem such as a reduction in yield.

The pitch-based ultrafine carbon fiber of the present invention has an average fiber diameter of 100 nm or more and less than 700 nm. The lower limit value of the average fiber diameter is preferably 600 nm or less, more preferably 500 nm or less, still more preferably 400 nm or less, still more preferably 300 nm or less. The lower limit value of the average fiber diameter is preferably 110 nm or more, more preferably 120 nm or more, still more preferably 150 nm or more.

When the average fiber diameter is less than 100 nm, the fibrous carbon has a very small bulk density, and is thus poor in handling characteristics. In addition, stirring in preparation of a slurry may entangle fibers due to thinness of the fibers, leading to deterioration of dispersibility. Further, the electrode strength tends to decrease when an electrode mixture layer is formed. When the average fiber diameter is 700 nm or more, gaps may be easily generated in the electrode mixture layer, thus making it difficult to increase the electrode density. In addition, it is difficult to obtain sufficient dispersibility even when a surface treatment is performed.

Here, the fiber diameter in the present invention means a value measured with a photographic picture taken at a magnification of 5000 by a field emission-type scanning electron microscope.

In the pitch-based ultrafine carbon fiber of the present invention, the CV value of the fiber diameter is preferably in a range of more than 10% and 50% or less. So far as the dispersibility of the pitch-based ultrafine carbon fiber is concerned, the CV value of the fiber diameter is preferably as small as possible. However, when the CV value is in the above-mentioned range, the fiber diameter moderately varies. Thus, the contact property with a negative active material having various particle sizes can be enhanced, so that performance as a conductive aid is improved. As a result, the electric conductivity of the electrode mixture layer in the thickness direction can be increased. The CV value of the fiber diameter is more preferably in a range of more than 20% and 50% or less, still more preferably in a range of more than 30% and 45% or less. Here, the CV value is a value obtained by dividing a standard deviation by an average value and expressing the quotient as a percentage (%).

In the pitch-based ultrafine carbon fiber of the present invention, a distance (d002) between adjacent graphite sheets as measured by wide angle X-ray measurement is preferably 0.335 to 0.340 nm because crystallinity is extremely high. When the distance d002 is in a range of 0.335 to 0.340 nm, high conductivity is exhibited in the thickness direction in the electrode mixture layer. In addition, due to high crystallinity, favorable oxidation resistance is exhibited. The distance d002 is preferably in a range of 0.335 to 0.339.

The average fiber length of the pitch-based ultrafine carbon fiber of the present invention is 10 µm or more, preferably in a range of 10 to 100 µm, more preferably 10 to 50 µm, still more preferably 15 to 20 µm. It is not preferable that the average fiber length is less than 10 µm because while dispersibility is easily improved, conductivity in the electrode mixture layer, the strength of the electrode, and electrolyte solution retainability are deteriorated. It is not preferable that the average fiber length is more than 100 µm, because even when a surface treatment is performed, the pitch-based ultrafine carbon fiber has poor dispersibility. In addition, when the pitch-based ultrafine carbon fiber is excessively long, the pitch-based ultrafine carbon fiber is easily oriented in the in-plane direction of the electrode mixture layer. As a result, it is difficult to form a conductive path in the thickness direction.

The ratio (L/D) of the average fiber length (L) and the average fiber diameter (D) of the pitch-based ultrafine carbon fiber of the present invention is preferably 30 or more, more preferably 50 or more, still more preferably 100 or more. When the ratio (L/D) is 30 or more, a conductive path is efficiently formed in the electrode mixture layer, so that electric conductivity in the thickness direction can be increased. A ratio (L/D) of less than 30 is preferable from the view point of dispersibility, but when the ratio (L/D) is less than 30, formation of a conductive path in the electrode mixture layer is apt to be insufficient, so that it may be unable to sufficiently reduce the resistance value of the electrode mixture layer in the thickness direction. The upper limit of the ratio (L/D) is not particularly limited, but it is preferably 1000 or less, more preferably 800 or less.

Preferably, the pitch-based ultrafine carbon fiber of the present invention has a linear structure. Here, the linear structure means that the degree of branching is 0.01 pieces/m or less. Branching refers to a granular part in which the pitch-based ultrafine carbon fiber is combined with other pitch-based ultrafine carbon fiber at a location other than the end part, and means that the main axis of the pitch-based ultrafine carbon fiber is branched midway, and that the main axis of the pitch-based ultrafine carbon fiber has a branched secondary axis.

The pitch-based ultrafine carbon fiber may be in a fibrous form as a whole. For example, pitch-based ultrafine carbon fibers of less than 1 µm come into contact with one another, or are combined with one another to integrally form a fiber shape (e.g. pieces of spherical carbon are connected in the form of a rosary by fusion etc., or a plurality of extremely short fibers are connected by fusion etc.).

Preferably, the pitch-based ultrafine carbon fiber of the present invention has high conductivity at a low packing density. This is because a pitch-based ultrafine carbon fiber having high conductivity at a low packing density can impart conductivity at a lower addition concentration. Specifically, the powder volume resistance in packing of the fibrous carbon at a packing density of 0.4 g/cm$^3$ is preferably 1 Ω·cm or less, more preferably 0.5 Ω·cm or less. It is not preferable that the packing density is more than 1 Ω·cm because the addition amount of the pitch-based ultrafine carbon fiber which is required for improving conductivity increases. The lower limit value is not particularly limited, but it is generally about 0.0001 Ω·cm. The powder volume resistance in packing of the fibrous carbon at a packing density of 0.8 g/cm$^3$ is preferably 0.1 Ω·cm or less, more preferably 0.070 Ω·cm or less, still more preferably 0.050 Ω·cm or less, still more preferably 0.040 Ω·cm or less. It is not preferable that the packing density is more than 0.1 Ω·cm because the addition amount of the pitch-based ultrafine carbon fiber which is required for improving conductivity increases. The lower limit value is not particularly limited, but it is generally about 0.0001 Ω·cm.

Preferably, the pitch-based ultrafine carbon fiber of the present invention does not substantially contain boron. When a boron atom combined with a carbon atom is present on the surface of the pitch-based ultrafine carbon fiber, the boron atom may act as an active point and cause a decomposition reaction of the battery electrolyte. Here, the phrase "does not substantially contain" means that the boron content is 1 ppm by mass or less.

1-2. Method for Manufacturing Pitch-Based Ultrafine Carbon Fiber

The method for manufacturing pitch-based ultrafine carbon fiber of the present invention is not particularly limited, but can be manufactured by passing through, for example, the following steps (1) to (5):

(1) a fiber formation step of preparing a resin composite fiber by molding a resin composition in a molten state to form a carbon precursor into a fiber, the resin composition including a thermoplastic resin, and 1 to 150 parts by mass of the carbon precursor based on 100 parts by mass of the thermoplastic resin; (2) a stabilization step of stabilizing the resin composite fiber to prepare a resin composite stabilized fiber; (3) a thermoplastic resin removing step of removing the thermoplastic resin from the resin composite stabilized fiber to separate only a stabilized fiber; (4) a carbonization or graphitization step of preparing a carbon fiber by heating the stabilized fiber under an inert atmosphere to carbonize or graphitize the stabilized fiber; and (5) a surface oxidation treatment step.

<Thermoplastic Resin>

The thermoplastic resin to be used in the method for manufacturing the carbon fiber of the present invention is capable of producing a resin composite fiber, and should be easily removed in the thermoplastic resin removing step. Examples of the thermoplastic resin include polyolefins, polyacrylate-based polymers such as polymethacrylate and polymethyl methacrylate, polystyrene, polycarbonate, polyarylate, polyester, polyamide, polyester carbonate, polysulfone, polyimide, polyetherimide, polyketone and polylactic acid. Among them, polyolefins are preferably used.

Specific examples of the polyolefins include polyethylene, polypropylene, poly-4-methylpentene-1, and copolymers containing these polymers. Polyethylene is preferably used because it is easily removed in the thermoplastic resin removing step. Examples of the polyethylene include homopolymers such as high-pressure low-density polyethylene, low-density polyethylene such as gas-phase/solution/high-pressure linear low-density polyethylene, medium-density polyethylene and high-density polyethylene;

copolymers of ethylene and an α-olefin; and copolymers of ethylene and other vinyl-based monomer, such as ethylene-vinyl acetate copolymers.

The thermoplastic resin for use in the present invention has a melt mass flow rate (MFR) of preferably 0.1 to 10 g/10 min, more preferably 0.1 to 5 g/10 min, especially preferably 0.1 to 3 g/10 min as measured in accordance with JIS K 7210 (1999). When the MFR is in the above-mentioned range, the carbon precursor can be favorably micro-dispersed in the thermoplastic resin. In addition, in molding of the resin composite fiber, the fiber is stretched, so that the fiber diameter of the resulting carbon fiber can be further reduced. The thermoplastic resin for use in the present invention has a glass transition temperature of preferably 250° C. or lower when being amorphous, and a melting point of preferably 300° C. or lower when being crystalline for ensuring that the thermoplastic resin can be easily melt-kneaded with the carbon precursor.

<Carbon Precursor>

It is preferable to use a mesophase pitch as the carbon precursor. Hereinafter, a case of using a mesophase pitch as the carbon precursor will be described. The mesophase pitch is a pitch capable of forming an optically anisotropic phase (liquid crystal phase) in a molten state. Examples of the mesophase pitch for use in the present invention include those obtained using a distillation residue of coal or petroleum as a raw material, and those obtained using an aromatic hydrocarbon such as naphthalene as a raw material. For example, a mesophase pitch derived from coal is obtained by a treatment mainly including hydrogenation/heat treatment of coal tar pitch; or a treatment mainly including hydrogenation/heat treatment/solvent extraction.

More specifically, the mesophase pitch can be obtained by the following method.

First, a coal tar pitch freed of a quinoline-insoluble component and having a softening point of 80° C. is hydrogenated in the presence of a Ni—Mo based catalyst at a pressure of 13 MPa and a temperature of 340° C. to obtain a hydrogenated coal tar pitch. The hydrogenated coal tar pitch is heat-treated at 480° C. under atmospheric pressure, and then decompressed to remove a low-boiling-point component, so that a crude mesophase pitch is obtained. Using a filter, the crude mesophase pitch is filtered at a temperature of 340° C. to remove foreign matters, whereby a purified mesophase pitch can be obtained.

The optical anisotropy content (mesophase ratio) of the mesophase pitch is preferably 80% or more, more preferably 90% or more.

In addition, the softening point of the mesophase pitch is preferably 100 to 400° C., more preferably 150 to 350° C.

<Resin Composition>

Preferably, a resin composition (hereinafter, also referred to as a mesophase pitch composition) which is used in the method for manufacturing the carbon fiber of the present invention and which includes a thermoplastic resin and a mesophase pitch contains a thermoplastic resin, and 1 to 150 parts by mass of a mesophase pitch based on 100 parts by mass of the thermoplastic resin. The content of the mesophase pitch is more preferably 5 to 100 parts by mass. It is not preferable that the content of the mesophase pitch is more than 150 parts by mass because a resin composite fiber having a desired dispersion diameter cannot be obtained, and it is not preferable that the content of the mesophase pitch is less than 1 part by mass because an intended carbon fiber cannot be manufactured at a low cost.

For manufacturing a carbon fiber having a fiber diameter of less than 700 nm, the dispersion diameter of the mesophase pitch in the thermoplastic resin is preferably 0.01 to 50 μm, more preferably 0.01 to 30 μm. When the dispersion diameter of the mesophase pitch in the thermoplastic resin is out of the range of 0.01 to 50 μm, it may be difficult to manufacture a desired carbon fiber. In the mesophase pitch composition, the mesophase pitch forms a spherical or elliptical island phase. When the island component has a spherical shape, the dispersion diameter in the present invention means a diameter thereof, and when the island component has an elliptical shape, the dispersion diameter in the present invention means a major axis thereof.

The dispersion diameter of 0.01 to 50 μm is kept in the above-mentioned range preferably after the mesophase pitch composition is held at 300° C. for 3 minutes, more preferably after the mesophase pitch is held at 300° C. for 5 minutes, and especially preferably after the mesophase pitch is held at 300° C. for 10 minutes. In general, when a mesophase pitch composition is held in a molten state, the mesophase pitch is aggregated in the thermoplastic resin with time. When the mesophase pitch is aggregated, so that the dispersion diameter thereof exceeds 50 μm, it may be difficult to manufacture a desired carbon fiber. The aggregation rate of the mesophase pitch in the thermoplastic resin varies depending on the types of a thermoplastic resin to be used and the mesophase pitch.

The mesophase pitch composition can be manufactured by kneading the thermoplastic resin and the mesophase pitch in a molten state. Melt-kneading of the thermoplastic resin and the mesophase pitch can be carried out using a known apparatus. For example, at least one selected from the group consisting of a single-screw kneader, a twin-screw kneader, a mixing roll and a Banbury mixer can be used. For favorably micro-dispersing the mesophase pitch in the thermoplastic resin, it is preferable to use a twin-screw kneader, and particularly it is preferable to use a twin-screw kneader in which each shaft is rotated in the same direction, among the apparatuses described above.

While kneading temperature is not particularly limited as long as the thermoplastic resin and the mesophase pitch are in a molten state, the kneading temperature is preferably 100 to 400° C., more preferably 150 to 350° C. It is not preferable that the kneading temperature is lower than 100° C. because the mesophase pitch is not brought into a molten state, and thus it is difficult to micro-disperse the mesophase pitch in the thermoplastic resin. On the other hand, it is not preferable that the kneading temperature is higher than 400° C. because decomposition of the thermoplastic resin or mesophase pitch may progress. In addition, the melt-kneading time is preferably 0.5 to 20 minutes, more preferably 1 to 15 minutes. It is not preferable that the melt-kneading time is less than 0.5 minutes because it is difficult to micro-disperse the mesophase pitch. On the other hand, it is not preferable that the melt-kneading time is more than 20 minutes because the productivity of the carbon fiber is noticeably deteriorated.

Melt-kneading is carried out preferably under an inert atmosphere having an oxygen gas content of less than 10% by volume, more preferably under an inert atmosphere having an oxygen gas content of less than 5% by volume, especially preferably under an inert atmosphere having an oxygen gas content of less than 1% volume. The mesophase pitch for use in the present invention may be denatured by reacting with oxygen during melt-kneading, leading to hindrance of micro-dispersion of the mesophase pitch in the thermoplastic resin. Thus, it is preferable to carry out melt-kneading under an inert atmosphere for suppressing a reaction between oxygen and the mesophase pitch.

<Resin Composite Fiber>

The method for manufacturing a resin composite fiber from the mesophase pitch composition is not limited as long as a desired carbon fiber can be prepared, and examples thereof may include a method in which a mesophase pitch composition is melt-spun using a spinning nozzle, and a method in which a mesophase pitch composition is melt-film forming using a rectangular nozzle.

For obtaining the carbon fiber of the present invention, it is necessary to pass through an orientation control operation for improving the molecular orientation property of the mesophase pitch contained in the resin composite fiber in a stage of preparing the resin composite fiber. In the orientation control operation, it is necessary to deform the mesophase pitch in a molten state for improving the molecular orientation property of the mesophase pitch in a molten state. Examples of the orientation control operation may include a method in which strain is applied to the mesophase pitch in a molten state by shearing, and a method in which strain is applied to the mesophase pitch by extension. Only one of these methods may be carried out, or both of these methods may be used in combination.

Examples of the method for applying strain by shearing include a method in which the linear velocity of the mesophase pitch composition in a molten state is increased. Specifically, by increasing the passage speed of the mesophase pitch composition in a molten state in a channel of a spinning nozzle or rectangular nozzle, strain can be applied by shearing.

Examples of the method for applying strain by extension include a method in which the linear velocity of the mesophase pitch composition in a molten state is gradually increased as going toward the discharge side of a spinning nozzle or a rectangular nozzle. Specific examples thereof include a method in which the cross-sectional area of a channel of a nozzle is gradually reduced as going toward the discharge side (deformation inside the nozzle), and a method in which the mesophase pitch composition discharged from a discharge hole of a spinning nozzle or rectangular nozzle is taken up at a linear velocity higher than the discharge linear velocity (deformation outside the nozzle). In the case of deformation inside the nozzle, the mesophase pitch with the molecular orientation property improved by deformation is apt to have poor molecular orientation property as a result of thermal relaxation. On the other hand, in the case of deformation outside the nozzle, the mesophase pitch with the molecular orientation property improved by deformation is immediately cooled to reduce flowability thereof, so that the molecular orientation property of the mesophase pitch is retained. Thus, as the orientation control operation, a method is preferable in which strain is applied outside the nozzle by extension.

Each of the shear strain rate and the extension strain rate is preferably 5 to 10000 $s^{-1}$, more preferably 100 to 1400 $s^{-1}$. When the strain rate is less than 5 $s^{-1}$, it may be unable to sufficiently improve the molecular orientation property of the mesophase pitch. When the strain rate is more than 10000 $s^{-1}$, deformation of the mesophase pitch cannot follow, and thus it may be unable to deform the mesophase pitch in the form of a fiber.

The distance between the deformation start point and the deformation end point in the spinning nozzle or the rectangular nozzle is preferably 0.1 to 5 mm. The lower limit value of the distance is preferably 0.3 mm, more preferably 0.5 mm, still more preferably 0.7 mm, especially preferably 1.0 mm. The upper limit value of the distance is preferably 4.0 mm, more preferably 3.0 mm, most preferably 2.0 mm.

Here, the distance between the deformation start point and the deformation end point in the nozzle refers to a length along a direction parallel to the axis center of a slit channel in a throttling portion formed in the nozzle. FIG. 9 is a sectional view showing an internal structure of a discharge port portion of the spinning nozzle. In FIG. 9, reference numeral 10 denotes a spinning nozzle, and reference numeral 15 denotes a slit channel. Reference numeral 11 denotes a point at which the size of the cross-section of the channel of the spinning nozzle starts to decrease, i.e. a deformation start point in the present invention. Reference numeral 13 denotes a point at which decrease of the size of the cross-section of the channel of the spinning nozzle is ended, i.e. a deformation end point in the present invention. The distance between the deformation start point and the deformation end point is a linear distance along a direction parallel to the axis center of a slit channel connecting the deformation start point 11 and the deformation end point 13. The introduction angle θ formed in the throttling portion of the spinning nozzle is 30 to 90 degrees, preferably 40 to 80 degrees, more preferably 45 to 75 degrees.

When a spinning nozzle having the above-mentioned shape is used, strain is moderately applied by shearing at the time when the mesophase pitch composition in a molten state passes through the channel of the spinning nozzle, so that the molecular orientation property of the mesophase pitch can be improved.

The distance between the deformation start point and the deformation end point outside the spinning nozzle is preferably 5 to 100 mm. The lower limit value of the distance is preferably 6 mm, more preferably 7 mm, especially preferably 8 mm. The upper limit value of the distance is preferably 90 mm, more preferably 80 mm, still more preferably 70 mm, especially preferably 60 mm, most preferably 50 mm. Here, the distance between the deformation start point and the deformation end point outside the nozzle means the shortest distance between the tip of the slit channel outlet of the spinning nozzle and the cast surface, and when a cooling drum is used, the distance between the deformation start point and the deformation end point outside the nozzle means the shortest distance between the tip of the slit channel outlet of the spinning nozzle and the moving surface of the cooling drum.

The draft ratio, which is a ratio of the discharge linear velocity and the take-up rate, is preferably 2 to 100, more preferably 2 to 50. It is not preferable that the draft ratio is more than 100 because deformation of the mesophase pitch cannot follow, and thus the mesophase pitch cannot be deformed into a fibrous shape. When the draft ratio is less than 2, the molecular orientation property of the mesophase pitch cannot be improved, and as a result, the crystallinity of the resulting carbon fiber is reduced.

The temperature at the time of passing through the operation for improving the initial orientation property of the mesophase pitch is required to be higher than the melting temperature of the mesophase pitch, and is preferably 150 to 400° C., more preferably 180 to 350° C. When the temperature is higher than 400° C., the deformation relaxation rate of the mesophase pitch increases, so that it is difficult to maintain the shape of a fiber.

In addition, the process for manufacturing a resin composite fiber may include a cooling step. As the cooling step, mention is made of, for example, a method in which the atmosphere downstream of the spinning nozzle is cooled in the case of melt spinning. In the case of melt-film forming, mention is made of a method in which a cooling drum is provided downstream of the rectangular nozzle. By providing the cooling step, a region where the mesophase pitch is deformed by extension can be adjusted, and the rate of strain can be adjusted. In addition, by providing the cooling step, the resin composite fiber after spinning or deposition is immediately cooled and solidified to enable stable molding.

By performing control as described above, the molecular orientation property of the mesophase pitch can be improved.

<Resin Composite Stabilized Fiber>

From the resin composite fiber obtained as described above, a resin composite stabilized fiber is prepared by stabilizing (also referred to as "infusibilizing") a mesophase pitch fiber contained in the resin composite fiber. The stabilization can be carried out by a known method such as a gas flow treatment using air, oxygen, ozone, nitrogen dioxide, a halogen or the like, and a solution treatment using an acidic aqueous solution or the like. Infusibilization by a gas flow treatment is preferable from the viewpoint of productivity.

As a gas component to be used, air, oxygen, or a mixed gas containing air and oxygen is preferable from the viewpoint of ease of handling, and use of air is especially preferable from the viewpoint of cost. The concentration of an oxygen gas to be used is preferably in a range of 10 to 100% by volume based on the total gas composition. When the oxygen gas concentration is less than 10% by volume based on the total gas composition, a considerably large amount of time is required to stabilize the mesophase pitch contained in the resin composite fiber.

The reaction temperature for stabilization is preferably 25 to 350° C., and the treatment time for stabilization is preferably 10 to 300 minutes.

The softening point of the mesophase pitch is markedly increased by the stabilization treatment. In view of the purpose of obtaining a desired carbon fiber, the softening point of the mesophase pitch is preferably 400° C. or higher, more preferably 500° C. or higher.

<Thermoplastic Resin Removing Step>

Next, the thermoplastic resin contained in the resin composite stabilized fiber obtained as described above is removed to separate the stabilized fiber. In this step, the thermoplastic resin is decomposed and removed while thermal decomposition of the stabilizing fiber is suppressed. Examples of the method for decomposing and removing the thermoplastic resin include a method in which the thermoplastic resin is removed using a solvent, and a method in which the thermoplastic resin is thermally decomposed to be removed.

Preferably, thermal decomposition of the thermoplastic resin is carried out under an inert gas atmosphere. The inert gas atmosphere mentioned here means a gas atmosphere of carbon dioxide, nitrogen, argon or the like. The oxygen concentration thereof is preferably 30 ppm by volume or less, more preferably 20 ppm by volume or less. As the inert gas to be used in this step, carbon dioxide and nitrogen are preferably used, and nitrogen is especially preferably used from the viewpoint of cost.

Thermal decomposition of the thermoplastic resin can also be carried out under a reduced pressure. By carrying out thermal decomposition under a reduced pressure, the thermoplastic resin can be sufficiently removed. As a result, a carbon fiber or a graphitized fiber obtained by carbonizing or graphitizing the stabilized fiber is capable of reducing fusion between fibers. The atmospheric pressure is preferably as low as possible, and is preferably 50 kPa or less, more preferably 30 kPa or less, still more preferably 10 kPa or less, especially preferably 5 kPa or less. On the other hand, since it is difficult to achieve perfect vacuum, the lower limit of the pressure is generally 0.01 kPa or more.

When the thermoplastic resin is removed by thermal decomposition, a very small amount of oxygen and an inert gas may be present as long as the atmosphere pressure is maintained. Particularly, it is advantageous and preferable that a very small amount of an inert gas is present because fusion between fibers due to thermal deterioration of the thermoplastic resin is suppressed. The term "under an atmosphere of a very small amount of oxygen" as mentioned here means that the oxygen concentration is 30 ppm by volume or less, and the term "under an atmosphere of a very small amount of an inert gas" as mentioned here means that the inert gas concentration is 20 ppm by volume or less. The type of inert gas to be used is as described above.

The thermal decomposition temperature is preferably 350 to 600° C., more preferably 380 to 550° C. When the thermal decomposition temperature is lower than 350° C., thermal decomposition of the stabilized fiber can be suppressed, but it may be unable to sufficiently perform thermal decomposition of the thermoplastic resin. On the other hand, when the thermal decomposition temperature is higher than 600° C., thermal decomposition of the thermoplastic resin can be sufficiently performed, but the stabilized fiber may be thermally decomposed, and as a result, the yield during carbonization is easily reduced. The thermal decomposition time is preferably 0.01 to 10 hours, more preferably 0.05 to 10 hours.

In the manufacturing method of the present invention, it is preferable that the stabilization step and the thermoplastic resin removing step are carried out with the resin composite fiber or resin composite stabilized fiber held on a support base material in a basis weight of 2000 g/m$^2$ or less. By holding on the support base material, it is possible to suppress the aggregation of the resin composite fiber or the resin composite stabilized fiber caused by the heat treatment at the time of the stabilization treatment or removal of the thermoplastic resin, and to maintain the air permeability Is possible.

A material that is not deformed or corroded by a solvent or heating is required as the material of the support base material. In addition, the heat-resistant temperature of the support base material is preferably 600° C. or higher because the support base material should not be deformed at a thermal decomposition temperature in the thermoplastic resin removing step. Examples of the material that meets such a requirement may include metallic materials such as stainless steel, and ceramic materials such as alumina and silica.

The shape of the support base material is preferably a shape having air permeability in a direction perpendicular to the surface. A mesh structure is preferable as such a shape. The aperture of the mesh is preferably 0.1 to 5 mm. It is not preferable that the aperture is more than 5 mm because fibers may be easily aggregated on the mesh line by a heating treatment, leading to insufficient stabilization of the mesophase pitch and insufficient removal of the thermoplastic resin. On the other hand, it is not preferable that the aperture of the mesh is less than 0.1 mm because the gas permeability of the support base material in a perpendicular direction to the surface may be reduced due to a decrease in porosity of the support base material.

<Carbonization and Firing Step>

By carbonizing and/or graphitizing the stabilized fiber under an inert atmosphere, the pitch-based ultrafine carbon fiber of the present invention is obtained. As a container to be used here, a crucible-like container made of graphite is preferable. Here, the carbonization refers to heating at a relatively low temperature (preferably about 1000° C.), and the graphitization refers to growth of graphite crystals by heating at a higher temperature (preferably about 3000° C.).

Examples of the inert gas to be used for carbonization and/or graphitization of the stabilized fiber include nitrogen and argon. The concentration of oxygen in the inert atmosphere is preferably 20 ppm by volume or less, more preferably 10 ppm by volume or less. The firing temperature during carbonization and/or graphitization is preferably 500 to 3500° C., more preferably 800 to 3200° C. In particular, the firing temperature in graphitization is preferably 2000° C. or higher and lower than 3000° C., more preferably 2100° C. to 2900° C. When the temperature during graphitization is lower than 2000° C., crystal growth may be hindered to the extent that the crystallite length is insufficient, leading to marked deterioration of conductivity. In addition, a graphitization temperature of 3000° C. or higher is preferable in terms of crystal growth, but tends to reduce the content of oxygen present on the surface of the carbon fiber. The firing time is preferably 0.1 to 24 hours, more preferably 0.2 to 10 hours.

<Surface Oxidation Treatment Step>

The resulting pitch-based ultrafine carbon fiber is subjected to a surface oxidation treatment for improving affinity with water. Examples of the functional group bonded to the surface of the pitch-based ultrafine carbon fiber include a hydroxyl group, and carbonyl groups such as a carboxyl group and an acid anhydride. The bonding amount of functional groups on the surface can be quantitatively determined from a peak intensity ratio measured by X-ray photoelectron spectroscopy.

In the present invention, by performing the surface oxidation treatment, the bonding amount of C—O groups is made relatively larger as compared to the bonding amount of C=O groups that have high hydrophobicity. This makes it possible to relatively increase the bonding amount of OH groups that are directly bonded to an aromatic ring. The present inventors think that an OH group directly bonded to an aromatic ring has a higher effect of enhancing hydrophilicity as compared to an OH group that forms a carboxyl group.

Examples of the specific surface oxidation treatment method include a method in which the carbon fiber is subjected to an air oxidation treatment. More specifically, a heat treatment is performed for 5 to 150 minutes in an air atmosphere at 600° C. or higher, or a heat treatment is performed in an air atmosphere at 550° C. or higher for a time of more than 60 minutes. However, when a heat treatment is performed in an air atmosphere at 550° C. or higher and lower than 600° C., the heat treatment time may be reduced as the temperature becomes higher, i.e. closer to 600° C., and for example, when the temperature is 560° C. or higher and lower than 600° C., the heat treatment time may be about 5 to 100 minutes. By performing heating under the severe condition of 550° C. or higher, air-oxidation occurs efficiently and with high productivity, so that the pitch-based carbon fiber of the present invention can be obtained while extremely high crystallinity is maintained.

From the viewpoint of production efficiency, it is preferable to perform a heat treatment at 600° C. or higher. When a heat treatment is performed at 600° C. or higher, the lower limit of the heat treatment temperature is preferably 610° C., more preferably 620° C. The upper limit of the heat treatment temperature is preferably 800° C. or lower, more preferably 700° C. or lower.

When a heat treatment is performed at 550° C. or higher and lower than 600° C., the lower limit of the heat treatment temperature is preferably 565° C.

When the heat treatment temperature is lower than 550° C., it is difficult to increase the number of C—O bonds on the surface of the pitch-based ultrafine carbon fiber. It is not preferable that the temperature is higher than 800° C. because the pitch-based ultrafine carbon fiber is burned, leading to a reduction in recovery ratio.

When a heat treatment is performed at 600° C. or higher, the heat treatment time is 5 minutes or more, preferably 10 minutes or more, more preferably 20 minutes or more, still more preferably 30 minutes or more although the heat treatment time depends on the heat treatment temperature. The upper limit of the heat treatment time is not particularly limited, but it is preferably 120 minutes, more preferably 100 minutes. When the heat treatment time is less than 5 minutes, it is difficult to increase the number of C—O bonds on the surface of the pitch-based ultrafine carbon fiber. It is not preferable that the heat treatment time is more than 120 minutes principally in terms of economic efficiency although there is no particular problem.

In general, examples of the method for surface treatment of a carbon fiber may include a chemical liquid treatment, and a gas phase treatment. However, the carbon fiber of the present invention has the above-mentioned predetermined form for improving battery performance, and a carbon fiber having such a form cannot be given high dispersibility through a chemical liquid treatment. In the present invention, by performing a gas phase treatment, the number of C—O bonds can be made larger than the number of C=O bonds, so that high dispersibility can be obtained. In particular, from the viewpoint of productivity, treatment uniformity, stability and so on, an air oxidation treatment is employed.

The air atmosphere in the air oxidation treatment in the present invention refers to so called air. The air has a composition of about 80 vol % of nitrogen and about 20 vol % of oxygen, and the ratio of nitrogen and oxygen may be changed as long as air oxidation treatment is possible. In this case, the oxygen concentration is preferably in a range of 15 vol % to 21 vol %. In addition, the air may contain a small amount of inert gases such as argon and carbon dioxide, and a very small amount of hydrogen, nitrogen oxide, sulfur oxide and the like.

<Milling Treatment>

The method for manufacturing the pitch-based ultrafine carbon fiber of the present invention may include a milling treatment step. Preferably, the milling treatment is carried out in the thermoplastic resin removing step and/or the carbonization and firing step. In the milling method, it is preferable to use a fine mill such as a jet mill, a ball mill, a bead mill, an impeller mill or a cutter mill, and after milling, classification may be carried out as necessary. In the case of wet milling, a dispersion medium is removed after milling, but if marked secondary aggregation occurs here, subsequent handling is very difficult. In this case, it is preferable to carry out a crushing operation using a ball mill, a jet mill or the like after drying.

2. Negative Electrode for Nonaqueous Electrolyte Secondary Battery

A second aspect of the present invention is a negative electrode for a nonaqueous electrolyte secondary battery (hereinafter, also referred to simply as a "negative electrode") which is obtained using the pitch-based ultrafine carbon fiber. In the negative electrode, a negative electrode mixture layer as described below is formed on a surface of a current collector.

2-1. Negative Electrode Mixture Layer

The negative electrode mixture layer contains at least a negative active material and the pitch-based ultrafine carbon fiber of the present invention. The negative electrode mixture layer may further contain a binder, and other carbon-based conductive aid.

The thickness of the negative electrode mixture layer is not particularly limited, but it is preferably 50 μm or more, more preferably 70 μm or more, still more preferably 90 μm or more, especially preferably 100 μm or more. The upper limit of the thickness is not particularly limited, but it is generally less than 1000 μm, especially preferably less than 800 μm. When the thickness is less than 50 μm, the volume content of each of the separator and the current collector in the cell increases, leading to a decrease in volume occupancy of the active material layer. This is not preferable from the viewpoint of an energy density, and thus applications are considerably restricted. When the thickness is 1000 μm or more, cracks are easily generated in the negative electrode mixture layer, so that it is relatively difficult to manufacture the electrode mixture layer. In addition, when the thickness is 1000 μm or more, transportation of Li ions is easily hindered, so that resistance easily increases. The method for measuring the thickness of the negative electrode mixture layer is not particularly limited, and the thickness of the electrode mixture layer can be measured using, for example, a micrometer.

As a nonaqueous electrolyte secondary battery that is manufactured using the negative electrode mixture layer, mention is made of a lithium ion secondary battery as a typical battery. Hereinafter, a negative active material that is used in the lithium ion secondary battery will be described.

<Negative Active Material>

As the negative active material that is contained in the negative electrode mixture layer, any one or two or more materials can be appropriately selected from materials previously known as negative active materials in nonaqueous electrolyte secondary batteries, and used. For example, a carbon material; an alloy or oxide containing Si and/or Sn; or the like can be used as a material capable of absorbing and releasing lithium ions. In particular, a carbon material is preferable from the viewpoint of cost. Examples of the carbon material include natural graphite, artificial graphite manufactured by heat-treating petroleum-based or coal-based coke, hard carbon obtained by carbonizing a resin, and mesophase pitch-based carbon materials.

When natural graphite or artificial graphite is used, graphite in which the (002) surface spacing d (002) is in a range of 0.335 to 0.337 nm as measured by a powder X-ray diffraction method is preferable for increasing the battery capacity. The natural graphite refers to graphitic materials that are naturally produced as an ore. The natural graphite is classified into two types according to an appearance and properties thereof. One type of natural graphite is scaly graphite having a high crystallinity degree, and the other type of natural graphite is earthy graphite having a low crystallinity degree. The scaly graphite is further classified into scale like graphite having a leaf-like appearance and massive scaly graphite. The locality, properties and type of natural graphite are not particularly limited. In addition, natural graphite, or particles manufactured with natural graphite as a raw material may be heat-treated, and used.

The artificial graphite refers to graphitic materials close to graphite and perfect crystals of graphite which are artificially prepared by a wide range of techniques. As a typical example, the artificial graphite can be manufactured in the following manner: tar or coke obtained from residues by dry distillation of coal, distillation of crude oil, or the like is fired at about 500 to 1000° C., and then graphitized at 2000° C. or higher. In addition, quiche graphite obtained by reprecipitating carbon from dissolved iron is one type of artificial graphite.

When as a negative active material, an alloy containing Si and/or Sn is used in addition to a carbon material, the expansion coefficient of the electrode during charge-discharge is reduced, and cycle characteristics are improved as compared to a case where Si and/or Sn are used alone, or each oxide is used. Particularly, a Si-based alloy is preferable. Examples of the Si-based alloy include alloys of Si and at least one element selected from the group consisting of B, Mg, Ca, Ti, Fe, Co, Mo, Cr, V, W, Ni, Mn, Zn, Cu and the like. Specific examples thereof include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $VSi_2$, $WSi_2$ and $ZnSi_2$. The negative active materials may be used alone, or used in combination of two or more thereof.

The average particle diameter of the negative active material is 10 μm or less. When the average particle diameter is more than 10 μm, the efficiency of the charge-discharge reaction under a large current is reduced. The average particle diameter is preferably 0.1 to 10 μm, more preferably 1 to 7 μm.

<Binder>

A binder may be used for forming the negative electrode mixture layer in the present invention. As a binder to be used in the negative electrode mixture layer, any binder can be used as long as it is capable of forming an electrode and has sufficient electrochemical stability. Examples of the binder include polyvinyl alcohol, polyacrylic acid, carboxymethyl cellulose (CMC), polytetrafluoroethylene (PTFE), polyvinylidene difluoride (PVDF), styrene butadiene rubber (SBR), fluoroolefin copolymer crosslinked polymers, polyimide, polyamideimide, aramid and phenol resins. Particularly, polyvinylidene fluoride (PVDF) is preferable. The binders may be used alone, or used in combination of two or more thereof. The form of the binder is not particularly limited, and may be a solid form or a liquid form (e.g. an emulsion). The binder can be appropriately selected in consideration of a method for manufacturing an electrode (particularly, dry kneading or wet kneading), solubility in an electrolytic solution, and the like.

The content of the binder in the negative electrode mixture layer is preferably 1 to 25% by mass, more preferably 3 to 15% by mass, still more preferably 5 to 10% by mass. When the content of the binder is less than 1% by mass, cracks may be generated in the negative electrode mixture layer, or the negative electrode mixture layer may be peeled from the current collector. When the content of the binder is more than 25% by mass, the amount of the active material in the electrode decreases, so that the energy density of the resulting battery is easily reduced.

(Carbon-Based Conductive Aid Other than Pitch-Based Ultrafine Carbon Fiber of the Present Invention)

The negative electrode mixture layer may contain a carbon-based conductive aid in addition to the pitch-based ultrafine carbon fiber of the present invention. Examples of the carbon-based conductive aid other than the pitch-based ultrafine carbon fiber may include carbon black, acetylene black, carbon nanotubes, VGCF, scale like carbon, graphene and graphite. These carbon-based conductive aids may be used alone, or used in combination of two or more thereof.

The shape of the carbon-based conductive aid is not particularly limited, but a particulate shape is preferable. The average particle size (primary particle size) of the carbon-based conductive aid is preferably 10 to 200 nm, more preferably 20 to 100 nm. The aspect ratio of the carbon-based conduction aid is 10 or less, preferably 1 to 5, more preferably 1 to 3.

The content of the carbon-based conductive aid other than the pitch-based ultrafine carbon fiber in the negative electrode mixture layer is preferably 0.5 to 5% by mass, more preferably 0.5 to 4% by mass, still more preferably 1 to 3% by mass.

2-2. Method for Manufacturing Negative Electrode for Nonaqueous Electrolyte Secondary Battery General methods for manufacturing a negative electrode including the negative electrode mixture layer include the following two methods. In one method, the negative active material, the pitch-based ultrafine carbon fiber, and a binder and other components as necessary are mixed and kneaded, and extrusion-molded into a film, and the film is rolled and drawn, and then bonded to a current collector.

In another method, the negative active material, the pitch-based ultrafine carbon fiber, a binder, a solvent that dissolves the binder, and other components are mixed to prepare a slurry, the slurry is applied to the surface of the current collector, a solvent is removed, and pressing is then performed.

In the present invention, either of the methods can be employed, but the latter method is more preferable, and therefore the latter method will be described in detail below.

The solid concentration (i.e. the ratio of the total mass of components other than a solvent of the slurry to the total mass of the slurry) in the slurry is preferably 10 to 30% by mass, more preferably 15 to 25% by mass. When the solid concentration is more than 30% by mass, it may be difficult to prepare a uniform slurry. In addition, when the solid concentration is less than 10% by mass, the viscosity of the slurry is insufficient, so that the negative electrode mixture layer laminated on the current collector may have an uneven thickness.

The solvent that is used in the slurry is not particularly limited, and examples thereof include N-methylpyrrolidone (NMP), dimethylacetamide (DMAc), dimethylformamide (DMF), dimethylsulfoxide (DMSO) and water. Particularly, NMP or DMAc is preferable. The solvents may be used alone, or used in combination of two or more thereof.

When the thixotropy in the slurry is excessively high in preparation of the negative electrode, it may be difficult to secure flowability that is suitable for coating. In this case, a slurry formation aid may be used. As the slurry formation aid, mention may be made of at least one selected from the group consisting of polyvinyl pyrrolidone, carboxymethyl cellulose, polyvinyl acetate and polyvinyl alcohol. In particular, it is preferable to use polyvinyl pyrrolidone. By adding a slurry formation aid as described above, sufficient flowability can be secured even with a small amount of a solvent, and the dispersibility of the carbon-based conductive aid is considerably improved. In addition, generation of cracks after removal of the solvent can be suppressed. The addition amount of the slurry formation aid is preferably 10% by mass or less, more preferably 0.5 to 10% by mass, still more preferably 0.5 to 8% by mass based on the total amount of components other than the solvent in the slurry. When the addition amount of the slurry formation aid is more than 10% by mass, the slurry viscosity may sharply decreases, resulting in poor dispersion which makes it difficult to prepare a suitable slurry. When the addition amount of the slurry formation aid is less than 0.5% by mass, the effect of the slurry formation aid is hardly exhibited.

The slurry is applied to the surface of the later-described current collector. As a coating method, an appropriate coating method using a doctor blade or the like can be employed. After application of the slurry, the solvent is removed by, for example, performing a heating treatment at 60 to 100° C., preferably at 75 to 85° C. preferably for 60 to 180 minutes. Thereafter, the negative electrode of the present invention can be manufactured by pressing the coated product after removal of the solvent. As preferred pressing conditions, pressing is performed for 1 to 5 minutes under a pressure of 10 to 30 Pa.

For the current collector that forms the negative electrode, any conductive material can be used. For example, a metallic material of aluminum, nickel, iron, stainless steel, titanium or copper can be used. In particular, aluminum, stainless steel or copper is preferable, and use of aluminum or carbon-coated aluminum is more preferable.

The thickness of the current collector is preferably 10 to 50 μm.

3. Nonaqueous Electrolyte Secondary Battery

A third aspect of the present invention is a nonaqueous electrolyte secondary battery including the negative electrode of the present invention.

The nonaqueous electrolyte secondary battery of the present invention is formed using the negative electrode of the present invention, and using a known positive electrode, separator and electrolytic solution. As the nonaqueous electrolyte secondary battery, a lithium ion secondary battery is exemplified.

The nonaqueous electrolyte secondary battery of the present invention includes a positive electrode with a positive electrode mixture layer formed on the surface of the current collector, an electrolyte layer containing an electrolyte, and the negative electrode of the present invention. The positive electrode mixture layer of the positive electrode and the negative electrode mixture layer of the negative electrode face each other, and the electrolyte layer is laminated so as to be inserted between the positive electrode mixture layer and the negative electrode mixture layer.

The cell shape of the nonaqueous electrolyte secondary battery of the present invention is not particularly limited, and the nonaqueous electrolyte secondary battery can be provided in any cell shape. Specific examples thereof may include cell shapes such as a button shape, a cylindrical shape and a square shape. It is also preferable that the nonaqueous electrolyte secondary battery has an internal configuration in which a plurality of pairs of positive and negative electrodes and a separator are laminated. Here, it is possible to employ a known system of stack lamination type, winding type, folding lamination type or the like. Examples of the exterior material of the nonaqueous electrolyte secondary battery of the present invention may include metallic cans and aluminum laminate resin films. In the nonaqueous electrolyte secondary battery of the present invention, a predetermined carbon fiber added to the electrode mixture layer has a linear structure, has high dispersibility, and is therefore uniformly distributed in the electrode mixture layer, and also the carbon fiber has high conductivity, and therefore a conductive path is easily formed, so that an excellent charge-discharge characteristic can be obtained. Further, the electrode strength is improved.

<Electrolyte Layer>

For the electrolyte layer that forms the nonaqueous electrolyte secondary battery, a nonaqueous electrolytic solution with an electrolyte such as a lithium salt dissolved in a nonaqueous solvent is used.

The electric conductivity of the electrolytic solution to be used in the nonaqueous electrolyte secondary battery of the present invention is preferably $1 \times 10^{-2}$ S/cm or more at 25° C.

In general, the nonaqueous electrolytic solution is characterized by having higher voltage resistance and attaining a higher energy density as compared to an aqueous electrolytic solution. The nonaqueous solvent is not limited, and a known nonaqueous solvent can be used. Specific examples thereof include propylene carbonate, ethylene carbonate, diethyl carbonate, dimethyl carbonate, methylethyl carbonate, dimethoxyethane, γ-butyrolactone, γ-valerolactone, acetonitrile, nitromethane, methoxyacetonitrile, nitroethane, N,N-dimethylformamide, 3-methoxypropionitrile, N-methylpyrrolidone, N,N'-dimethylimidazolidinone, dimethylsulfoxide, sulfolane, 3-methylsulfolane and ethylmethyl carbonate. These nonaqueous solvents may be used alone, or used in combination of two or more thereof. It is important that the solvent to be used in the electrolytic solution has an appropriate boiling point, melting point, viscosity and specific dielectric constant, and among the above-mentioned solvents, those mainly containing propylene carbonate or γ-butyrolactone are preferably used.

Examples of the electrolyte to be used in the nonaqueous electrolyte secondary battery of the present invention include $LiClO_4$, $LiBF_4$, $LiPF_6$, $LiAlCl_4$, $LiSbF_6$, LiSCN, $LiCF_3SO_3$, $LiCF_3CO_2$, $LiAsF_6$, lower aliphatic lithium carboxylate, LiCl, LiBr, LiI, chloroborane lithium, borates and imide salts. Examples of the borates include lithium bis(1,2-benzenediolate(2-)-O,O')borate, lithium bis(2,3-naphthalenediolate(2-)-O,O')borate, lithium bis(2,2'-biphenyldiolate(2-)-O,O')borate and lithium bis(5-fluoro-2-oleate-1-benzenesulfonic acid-O,O')borate. Examples of the imide salts include bis-trifluoromethanesulfonic acid imide lithium $((CF_3SO_2)_2NLi)$, trifluoromethanesulfonic acid nonafluorobutanesulfonic acid imide lithium $(LiN(CF_3SO_2)(C_4F_9SO_2))$ and bis-pentafluoroethanesulfonic acid imide lithium $(C_2F_5SO_2)_2NLi)$. The concentration of the electrolyte is preferably 0.5 to 2 mol/L. The electrolytes may be used alone, or used in combination of two or more thereof. A known additive may be added to the electrolyte for the purpose of, for example, improving cycle stability and charge-discharge efficiency.

As the electrolytic solution to be used in the lithium ion secondary battery of the present invention, an ionic liquid typified by an ethyl methyl imidazolium salt can also be suitably used. Here, it is not necessarily required to dissolve the salt in the nonaqueous solvent.

<Separator>

When a nonaqueous electrolytic solution as described above is used, a separator is generally used in order to prevent the positive electrode mixture layer and the negative electrode mixture layer from coming into direct contact with each other. As the shape of the separator, a known shape such as a paper shape (film shape) or a porous film shape can be suitably employed. As the material of the separator, for example, at least one material selected from the group consisting of cellulose, aromatic polyamide, aliphatic polyimide, a polyolefin, Teflon (registered trademark), polyphenylene sulfide and so on can be suitably used. Among them, cellulose papers, and porous films of aromatic polyamide or aliphatic polyimide are preferable from the viewpoint of heat resistance and thickness reduction. The thickness of the separator is preferably about 20 to 100 μm for preventing a short-circuit, but in the present invention, it is also possible to use a separator with a thickness of about 5 to 20 μm, which is sufficiently thin as compared to a conventional separator. When a thin separator is used, internal resistance derived from the separator is reduced, so the power is improved, and the energy density of the cell is also improved.

EXAMPLES

Hereinafter, the present invention will be described further in detail by way of examples, but the present invention is not limited to these examples. Various kinds of measurements and analyses in examples were performed in accordance with the following methods, respectively.

(1) Examination of Shapes of Pitch-Based Ultrafine Carbon Fiber and Negative Electrode Obtained Using Pitch-Based Ultrafine Carbon Fiber Using a scanning electron microscope (S-2400 manufactured by Hitachi, Ltd.), observation was performed, and a picture was taken. The average fiber diameter of a pitch-based ultrafine carbon fiber etc. is determined by measuring the fiber diameters at 300 spots randomly selected in an electron micrograph, and calculating the average value of all the measurement results thereof (n=300). The average fiber length was calculated in the same manner as described above.

(2) X-Ray Diffraction Measurement of Pitch-Based Ultrafine Carbon Fiber

In X-ray diffraction measurement, the lattice surface spacing (d002) and the crystallite size (Lc 002) were measured in accordance with the JIS R 7651 method using RINT-2100 manufactured by Rigaku Corporation.

(3) X-Ray Photoelectron Spectroscopy (XPS) Measurement of Pitch-Based Ultrafine Carbon Fiber X-ray photoelectron spectroscopy was performed by narrow-scanning an O1s spectrum using Model: K-Alpha from Thermo Scientific Company. In addition, peak separation of the O1s spectrum was analyzed using Advantage 5.36.

(4) Method for Measuring Powder Volume Resistivity

The powder volume resistivity was measured with a four-probe-type electrode unit under a load of 0.25 to 2.50 kN using a powder resistance system (MCP-PD51) manufactured by Dia Instruments Co., Ltd. The powder volume resistivity of the sample was defined as a volume resistivity value at a packing density of 0.8 g/cm$^3$ from a relationship diagram of a volume resistivity with a change in packing density.

[Synthesis Example 1] (Method for Manufacturing Mesophase Pitch)

A coal tar pitch freed of a quinoline-insoluble component and having a softening point of 80° C. was hydrogenated in the presence of a Ni—Mo based catalyst at a pressure of 13 MPa and a temperature of 340° C. to obtain a hydrogenated coal tar pitch. The hydrogenated coal tar pitch was heat-treated at 480° C. under atmospheric pressure, and then decompressed to remove a low-boiling-point component, so that a mesophase pitch was obtained. The mesophase pitch was filtered using a filter at a temperature of 340° C. to remove foreign matters, so that a refined mesophase pitch was obtained.

[Manufacturing Example 1]<Manufacturing of Carbon Nanofiber (CNF)>

84 parts by mass of linear low-density polyethylene (MFR=1 g/10 min) as a thermoplastic resin and 16 parts by mass of a mesophase pitch (mesophase ratio 90.9%, softening point 303.5° C.) as a thermoplastic carbon precursor, were melt-kneaded in a co-rotating twin-screw extruder ("TEM-26SS" manufactured by TOSHIBA MACHINE CO., LTD., at a barrel temperature of 300° C. under a nitrogen gas stream) to prepare a resin composition. Using the resin composition, a resin composite fiber (a sea-island-type composite fiber containing a pitch as an island component) was prepared. Specifically, the resin composition was molded by a melt spinning machine into multifirament with a fiber diameter of 100 μm using a circular nozzle (see FIG. 15) having a diameter of 0.2 mm and an introduction angle of 60°. The nozzle temperature was 340° C., the discharge amount was 3.8 g/nozzle/hour, the shear rate was 1000 s$^{-1}$, and the draft ratio as a ratio of the discharge linear velocity and the take-up rate was 4. Under the conditions, the extension strain rate inside the nozzle was 982 s$^{-1}$, the deformation range outside the nozzle was 10 mm under the nozzle, and the extension strain rate was 9 s$^{-1}$.

Next, the resin composite fiber was treated in an oxidizing atmosphere at a temperature of 55° C. for 260 minutes to obtain a resin composite stabilized fiber.

Next, the resin composite stabilized fiber was placed in a vacuum gas purging furnace, and the furnace was purged with nitrogen, and then decompressed to 1 kPa. The temperature was elevated to 500° C. at a temperature elevation rate of 5° C./min under a reduced pressure, and held at 500° C. for 1 hour to remove the thermoplastic resin, thereby obtaining a stabilized fiber. The resulting stabilized fiber was added to a mixed solvent of ethanol/ion-exchanged water (volume ratio=1/1), and the mixture was milled for 10 minutes by a mixer to disperse the stabilized fiber. The resulting dispersion liquid was filtered. The stabilized fiber was heated to 1000° C. from room temperature at a rate of 5° C./min under nitrogen at a flow rate of 1 l/min, and held for 30 minutes after the temperature reached 1000° C., so that the stabilized fiber was carbonized. Further, the temperature was elevated to 3000° C. from room temperature over 3 hours under an argon gas atmosphere to prepare a carbon nanofiber. The resulting carbon nanofiber was subjected to a crushing treatment using a dry jet mill.

The resulting carbon nanofiber had a crystallite length (La) of 110.8 nm, a spacing (d002) of 0.3372 nm, a thickness (Lc) of 62.3 nm, an average fiber diameter of 257 nm, a fiber diameter CV value of 38.5%, an average fiber length of 16.6 μm, and a ratio (L/D) of 64.6. The powder volume resistance was 0.0539 Ω·cm.

Example 1

The CNF obtained in Manufacturing Example 1 was heated to 600° C. at a temperature elevation rate of 5° C./min in an electric furnace under an air atmosphere, and held for 30 minutes to heat-treat the CNF. Results of peaks derived from an O1s orbital in XPS measurement of the resulting oxidized CNF are shown in FIG. 1. The result of peak separation shows that a peak around 533 eV is derived from a C—O bond, and a peak around 531 eV is derived from a C=O bond. The abundance ratio of C—O bonds and C=O bonds depended on the peak intensity, and the ratio of C—O/C=O was 1.7. In addition, the powder volume resistance was 0.0448 Ω·cm. The values of La, d002, Lc, average fiber diameter, fiber diameter CV value, average fiber length and L/D did not change.

Example 2

Figure 2:
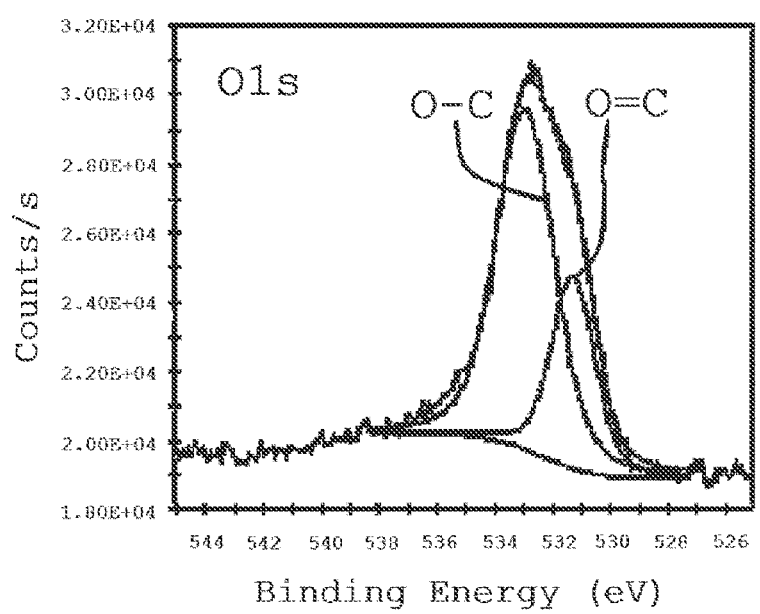
FIG. 2 shows XPS measurement results of CNF manufactured in Example 2.

Except that as heat treatment conditions, the temperature was 600° C., and the time was 120 minutes, the same procedure as in Example 1 was carried out to perform a treatment. FIG. 2 shows results of XPS measurement. As with Example 1, the ratio of C—O/C=O was 1.8 in terms of an intensity ratio of peaks derived from the O1s orbital. The powder volume resistance was 0.0466 Ω·cm. The values of La, d002, Lc, average fiber diameter, fiber diameter CV value, average fiber length and L/D did not change.

Example 3

Except that as heat treatment conditions, the temperature was 650° C., and the time was 10 minutes, the same procedure as in Example 1 was carried out to perform a treatment. The ratio of C—O/C=O was 1.2 in terms of an intensity ratio of peaks derived from the O1s orbital. The values of La, d002, Lc, average fiber diameter, fiber diameter CV value, average fiber length and L/D did not change.

Example 4

Except that as heat treatment conditions, the temperature was 600° C., and the time was 10 minutes, the same procedure as in Example 1 was carried out to perform a treatment. The ratio of C—O/C=O was 1.1 in terms of an intensity ratio of peaks derived from the O1s orbital. The values of La, d002, Lc, average fiber diameter, fiber diameter CV value, average fiber length and L/D did not change.

Example 5

Except that as heat treatment conditions, the temperature was 550° C., and the time was 120 minutes, the same procedure as in Example 1 was carried out to perform a treatment. The ratio of C—O/C=O was 1.4 in terms of an intensity ratio of peaks derived from the O1s orbital. The values of La, d002, Lc, average fiber diameter, fiber diameter CV value, average fiber length and L/D did not change.

Comparative Example 1

Figure 3:
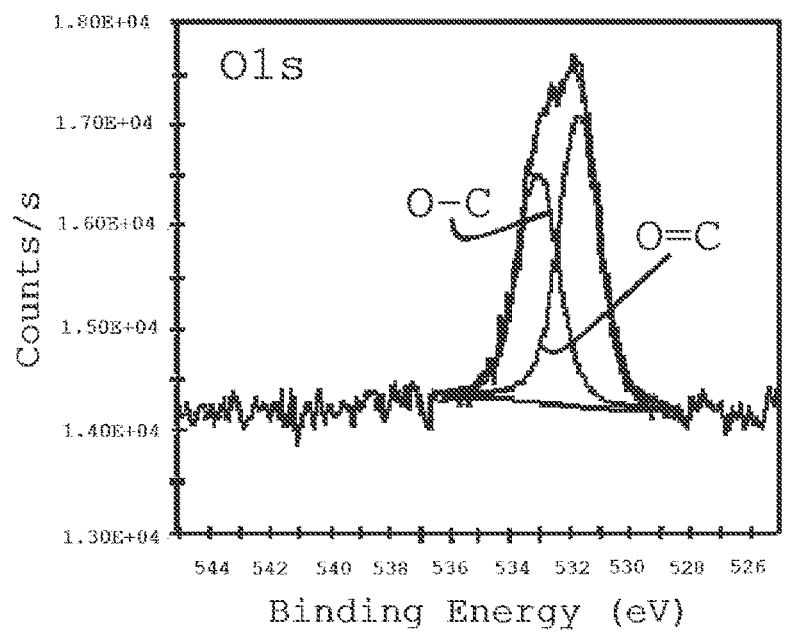
FIG. 3 shows XPS measurement results of CNF manufactured in Comparative Example 1.

XPS measurement of the CNF obtained in Manufacturing Example 1 was performed. FIG. 3 shows results of XPS measurement. The ratio of C—O/C=O was 0.64 in terms of an intensity ratio of peaks derived from the O1s orbital.

Comparative Example 2

Except that as heat treatment conditions, the temperature was 500° C., and the time was 30 minutes, the same procedure as in Example 1 was carried out to perform a treatment. The ratio of C—O/C=O was 0.83 in terms of an intensity ratio of peaks derived from the O1s orbital. The values of La, d002, Lc, average fiber diameter, fiber diameter CV value, average fiber length and L/D did not change.

Comparative Example 3

The carbon fiber obtained in Manufacturing Example 1 was added in hydrogen peroxide water (hydrogen peroxide concentration: 30%), mixed for 3 hours, washed with ion-exchanged water, then filtered, and dried. The ratio of C—O/C=O in the resulting carbon fiber was 0.58 in terms of an intensity ratio of peaks derived from the O1s orbital.

Comparative Example 4

The carbon fiber obtained in Manufacturing Example 1 was added in a mixed acid (mixed liquid of 150 ml of concentrated sulfuric acid (95%) and 50 ml of concentrated nitric acid (60 to 61%)), mixed for 1 hour, washed with ion-exchanged water, then filtered, and dried. The ratio of C—O/C=O in the resulting carbon fiber was 0.57 in terms of an intensity ratio of peaks derived from the O1s orbital.

Comparative Example 5

Figure 4:
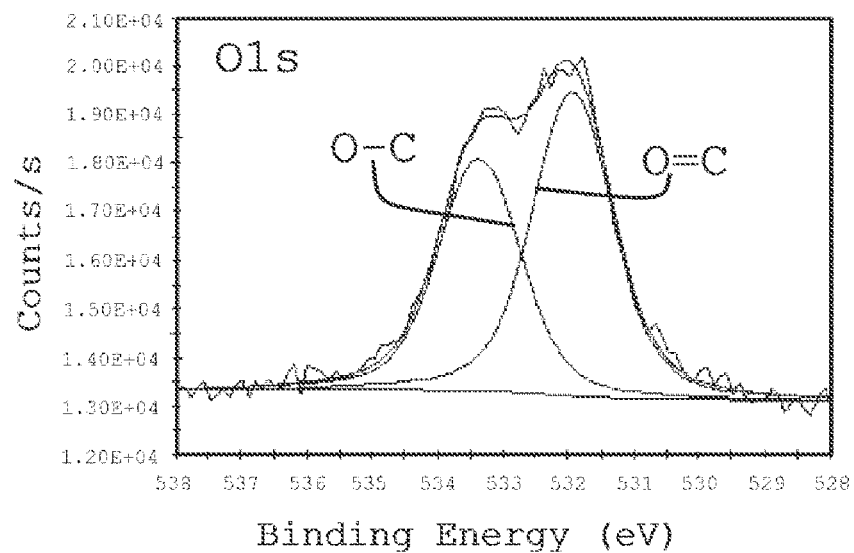
FIG. 4 shows XPS measurement results of CNF manufactured in Comparative Example 5.

Except that as heat treatment conditions, the temperature was 550° C., and the time was 60 minutes, the same procedure as in Example 1 was carried out to perform a treatment. FIG. 4 shows results of XPS measurement. The ratio of C—O/C=O was 0.90 in terms of an intensity ratio of peaks derived from the O1s orbital. The values of La, d002, Lc, average fiber diameter, fiber diameter CV value, average fiber length and L/D did not change.

Comparative Example 6

Except that in the method for manufacturing a carbon nanofiber as described in Manufacturing Example 1, 60 parts by mass of the thermoplastic resin and 40 parts by mass of the thermoplastic carbon precursor were mixed, and the draft ratio was changed to 1, the same procedure as in Manufacturing Example 1 was carried out to prepare a carbon nanofiber.

The resulting carbon nanofiber had an average fiber diameter of 727 nm, a fiber diameter CV value of 47.3%, an average fiber length of 14.2 μm, and a ratio (L/D) of 19.5. The carbon nanofiber was evaluated as an untreated product. The ratio of C—O/C=O in the resulting carbon fiber was 0.68 in terms of an intensity ratio of peaks derived from the O1s orbital.

Comparative Example 7

Except that the CNF obtained in Comparative Example 6 was heat-treated under the heat treatment condition of a temperature of 600° C. and a time of 30 minutes, the same procedure as in Example 1 was carried out to perform a treatment. The ratio of C—O/C=O in the resulting carbon fiber was 1.1 in terms of an intensity ratio of peaks derived from the O1s orbital. The values of La, d002, Lc, average fiber diameter, fiber diameter CV value, average fiber length and L/D did not change.

Comparative Example 8

Except that the CNF obtained in Comparative Example 6 was heat-treated under the heat treatment condition of a temperature of 600° C. and a time of 120 minutes, the same procedure as in Example 1 was carried out to perform a treatment. The ratio of C—O/C=O in the resulting carbon fiber was 1.2 in terms of an intensity ratio of peaks derived from the O1s orbital. The values of La, d002, Lc, average fiber diameter, fiber diameter CV value, average fiber length and L/D did not change.

Reference Example 1

The CNF obtained in Manufacturing Example 1, and carboxymethyl cellulose (CMC) as a dispersant were dispersed in water.

(Evaluation of Water Dispersibility)

For evaluation of water dispersibility, dispersibility was visually evaluated after CNF was dispersed in water at a concentration of 0.1% by mass, and left standing for 1 hour. For evaluation, a sample was rated x when CNF was inhomogeneous in water, and a sample was rated 0 when a state was maintained in which CNF was homogeneously dispersed in water. The results are shown in Tables 1 and 2. Photographs of the states of dispersion in water, which were obtained in the manufacturing methods, are shown in FIGS. 5, 6 and 7.

Dispersibility after standing for 24 hours was evaluated by measuring the height of a transparent layer of the dispersion liquid. The height of the whole dispersion liquid is 30 mm, and when the transparent layer generated after standing for 24 hours is 10 mm or less, it is considered that dispersibility in water is very favorable. The results are shown in Tables 1 and 2.

(Preparation of Model Negative Electrode Sheet 1)

A model negative electrode sheet was prepared using the CNF of each of Example 1 and Comparative Example 1. Using a Thinky mixer, graphite, CMC, SBR and CNF were mixed and kneaded at a ratio of 95:1.5:1.5:2 (mass ratio) while water was gradually added, so that a slurry was obtained. The slurry was cast on a copper foil, and dried to obtain a model negative electrode sheet. The surface of the resulting negative electrode sheet was observed with SEM. The result showed that in the negative electrode sheet obtained using CNF of Comparative Example 1 (FIG. 8), CNF was completely separated from graphite, and aggregated. On the other hand, it was shown that in the negative electrode sheet obtained using CNF of Example 1 (FIG. 9), CNF was dispersed on graphite. That is, during preparation of the slurry, an effect of high water dispersibility of CNF is exhibited.

(Preparation of Model Negative Electrode Sheet 2)

A model negative electrode sheet was prepared using the CNF of each of Example 2 and Comparative Example 1. Using a Thinky mixer, graphite, CMC, SBR and CNF were mixed and kneaded at a ratio of 92.5:3:2:2.5 (mass ratio) while water was gradually added, so that a slurry was obtained. A part of the slurry was cast on a copper foil, and dried to obtain a model negative electrode sheet. Photographs of the resulting negative electrode sheets are shown in FIGS. 10 and 11. Photographs of the resulting negative electrode sheets pressed with a force of 7 kgw/mm$^2$ are shown in FIGS. 12 and 13. As a result, the negative electrode sheet obtained using CNF of Comparative Example 1 (FIGS. 10 and 12) had many irregularities on the surface of the negative electrode sheet, and the negative electrode sheet obtained using CNF of Example 2 had high surface smoothness (FIGS. 11 and 13). That is, CNF of Example 2 had excellent dispersibility.

Next, a part of the resulting slurry was more intensely mixed and kneaded at a circumferential speed of 30 m/s for 30 seconds and 2 minutes, respectively, using a thin film swirling high-speed mixer FILMIX (registered trademark, Model 30-L manufactured by PRIMIX Corporation). The resulting mixture was cast on a copper foil, and dried to obtain a model negative electrode sheet. Ten visual fields of the resulting negative electrode sheet were observed at a magnification of 5000 using SEM, and the number of visual fields was counted in which CNF was aggregated as shown in FIG. 14. The results are shown in Table 3.

The result showed that in the negative electrode sheet obtained using CNF of Comparative Example 1, many parts of CNF were completely separated from graphite, and aggregated. On the other hand, it was shown that in the negative electrode sheet obtained using CNF of Example 2, CNF was dispersed on graphite. That is, during preparation of the slurry, an effect of high water dispersibility of CNF is exhibited.

TABLE 1

|  | Example 1 | Example 2 | Example 3 | Example 4 | Example 5 | Comp. Ex 1 | Comp. Ex 2 | Comp. Ex 3 | Comp. Ex 4 | Comp. Ex 5 | Ref. Ex 1 |
|---|---|---|---|---|---|---|---|---|---|---|---|
| Heat treatment temperature (° C.) | 600 | 600 | 650 | 600 | 550 | — | 500 | — | — | 550 | — |
| Heat treatment time (minutes) | 30 | 120 | 10 | 10 | 120 | — | 30 | — | — | 60 | — |
| C—O/C=O | 1.7 | 1.8 | 1.2 | 1.1 | 1.4 | 0.64 | 0.83 | 0.58 | 0.57 | 0.90 | 0.64 |
| Dispersant | None | None | None | None | None | None | None | None | None | None | CMC |
| Photograph in FIG. 5 | No. 4 | No. 5 | No. 6 | No. 7 | No. 8 | No. 2 | No. 3 | — | — | No. 9 | No. 1 |
| Height of transparent layer (mm) | 6 | 3 | 7 | 5 | 9 | 26 | 26 | 28 | 20 | 18 | 1 |
| Evaluation of dispersion degree | ○ | ○ | ○ | ○ | ○ | x | x | x | ○ | x | ○ |

TABLE 2

|  | Comp. Ex 6 | Comp. Ex 7 | Comp. Ex 8 |
|---|---|---|---|
| Heat treatment temperature (° C.) | — | 600 | 600 |
| Heat treatment time (minutes) | — | 30 | 120 |
| C—O/C=O | 0.68 | 1.1 | 1.2 |
| Dispersant | None | None | None |
| Photograph in FIG. 7 | No. 10 | No. 11 | No. 12 |
| Height of transparent layer (mm) | 29 | 27 | 26 |
| Evaluation of dispersion degree | x | x | x |

TABLE 3

|  | Example 2 | | Comparative Example 1 | |
|---|---|---|---|---|
|  | FILMIX treatment conditions | | | |
|  | 30 m/s, 30 sec | 30 m/s, 2 min | 30 m/s, 30 sec | 30 m/s, 2 min |
| Number of observed visual fields of CNF aggregates | 2 | 0 | 8 | 10 |

REFERENCE SIGNS LIST

10 Nozzle
11 Deformation start point
13 Deformation end point
15 Slit channel
6 Introduction angle

The invention claimed is:

1. A pitch-based ultrafine carbon fiber having an average fiber diameter of 100 nm or more and less than 700 nm, and an average fiber length of 10 μm or more, wherein an abundance ratio (molar ratio) of C—O bonds and C=O bonds derived from an O1s orbital as measured by X-ray photoelectron spectroscopy is 1.1 or more and 3.0 or less.

2. The pitch-based ultrafine carbon fiber according to claim 1, wherein the pitch-based ultrafine carbon fiber comprises adjacent graphite sheets, and a distance (d002) between the adjacent graphite sheets as measured by wide angle X-ray measurement is 0.335 to 0.340 nm.

3. The pitch-based ultrafine carbon fiber according to claim 2, wherein a powder volume resistance in packing at a packing density of 0.8 g/cm$^3$ is 0.1 Ωcm or less.

4. The pitch-based ultrafine carbon fiber according to claim 1, wherein a powder volume resistance in packing at a packing density of 0.8 g/cm$^3$ is 0.1Ωcm or less.

5. The pitch-based ultrafine carbon fiber according to claim 1, wherein a CV value of the average fiber diameter is in a range of more than 10% and 50% or less.

6. A method for manufacturing the pitch-based ultrafine carbon fiber according to claim 1, the method comprising subjecting the ultrafine carbon fiber to an air oxidation treatment.

7. The method for manufacturing the pitch-based ultrafine carbon fiber according to claim 6, wherein the air oxidation treatment is a heat treatment performed in an air atmosphere at 600° C. or higher for 5 to 150 minutes.

8. The method for manufacturing the pitch-based ultrafine carbon fiber according to claim 6, wherein the method comprises:

(1) a fiber formation step of preparing a resin composite fiber by molding a resin composition in a molten state to form a carbon precursor into a fiber, the resin composition including a thermoplastic resin, and 1 to 150 parts by mass of the carbon precursor based on 100 parts by mass of the thermoplastic resin;

(2) a stabilization step of stabilizing the resin composite fiber to prepare a resin composite stabilized fiber;

(3) a thermoplastic resin removing step of removing the thermoplastic resin from the resin composite stabilized fiber to separate only a stabilized fiber;

(4) a carbonization or graphitization step of preparing a carbon fiber by heating the stabilized fiber under an inert atmosphere to carbonize or graphitize the stabilized fiber; and (5) a surface oxidation treatment step comprising the air oxidation treatment.

9. The method for manufacturing the pitch-based ultrafine carbon fiber according to claim 8, wherein the thermoplastic resin is selected from polyolefins, polyacrylate-based polymers, polystyrene, polycarbonate, polyarylate, polyester, polyamide, polyester carbonate, polysulfone, polyimide, polyetherimide, polyketone, and polylactic acid.

10. The method for manufacturing the pitch-based ultrafine carbon fiber according to claim 9, wherein the thermoplastic resin is selected from polyolefins.

11. The method for manufacturing the pitch-based ultrafine carbon fiber according to claim 10, wherein the thermoplastic resin is polyethylene.

12. A negative electrode for a nonaqueous electrolyte secondary battery comprising the pitch-based ultrafine carbon fiber according to claim 1.

13. A nonaqueous electrolyte secondary battery comprising the negative electrode for a nonaqueous electrolyte secondary battery according to claim 12.

* * * * *